United States Patent [19]

Sherman

[11] Patent Number: 4,718,184
[45] Date of Patent: Jan. 12, 1988

[54] PICTURE FRAME CORNER JOINING SYSTEM

[75] Inventor: Charles F. Sherman, Townsend, Mass.

[73] Assignee: Esselte Pendaflex Corporation, Garden City, N.Y.

[21] Appl. No.: 784,272

[22] Filed: Oct. 4, 1985

[51] Int. Cl.[4] ............................................. G09F 1/12
[52] U.S. Cl. .................................... 40/155; 403/402
[58] Field of Search ................. 403/401, 402, 348; 40/155; 411/388

[56] References Cited

U.S. PATENT DOCUMENTS

| | | | |
|---|---|---|---|
| 3,955,298 | 5/1976 | Kapstad | 40/152 |
| 4,122,617 | 10/1978 | Nielsen | 40/155 |
| 4,205,470 | 6/1980 | Kapnek | 40/155 |
| 4,348,127 | 9/1982 | Hays, Jr. | 40/155 |
| 4,403,434 | 9/1983 | Jenkins | 40/152 |
| 4,493,583 | 1/1985 | Wallace | 403/402 |

FOREIGN PATENT DOCUMENTS

2402791  5/1979  France ................. 403/402

Primary Examiner—Robert P. Swiatek
Assistant Examiner—Cary E. Stone
Attorney, Agent, or Firm—Darby & Darby

[57] ABSTRACT

A frame formed by frame sections joined end to end; each frame section having an elongated channel with a rear wall, spaced apart lips opposite the rear wall and defining a longitudinally directed slot and a side wall joining inner edges of each of the lips to a different edge of the rear wall. Securing adjacent pairs of the sections is a bracket having a pair of legs disposed at an angle substantially identical to the angle made by the frame sections, the legs fitting within the channels of said frame sections at their corner junction and having a width greater than the width of the slots so as to retain the bracket within the channels. A screw with an externally threaded shank is received by a threaded hole in each bracket leg. Each has an outer end adapted to accommodate a tool for producing axial rotation of the screw so as to force outer surface portions of the legs into engagement with inner surface portions of the lips and an inner end defining a contact surface engaging the rear wall of the channel and having an area substantially larger than the cross-sectional area of the shank.

12 Claims, 4 Drawing Figures

PICTURE FRAME CORNER JOINING SYSTEM

BACKGROUND OF THE INVENTION

This invention relates generally to a picture frame and, more particularly, to a novel corner joining system for picture frames.

There exist a number of commercially available picture frames and frame sections formed from extruded metal such as aluminum. These picture frames often are available in unassembled kit form. The most common technique for assembling the picture frame sections into the complete frame includes the provision of channels on the rear surface of the frame sections, with the channels of adjacent sections in the corners of the frame meeting in L-shaped configuration. Typically, the adjacent ends of the frame sections have been assembled, to form a corner of the frame, by placing an L-shaped bracket at each corner of the frame so that each leg of the bracket extends into the channel of one of the adjacent frame sections. Each of the bracket legs is secured to its associated framing section by suitable locking means, usually a screw which is threaded through the leg of the bracket and which is urged firmly against the rearwardly facing, inner surface of the channel formed on the rear surface of each framing member.

Because, in the above described arrangement, the set screws are forced against the relatively soft aluminum frame section under considerable pressures, the aluminum tends to become pitted or marred and thus damaged. This becomes a significant disadvantage particularly when the frame is to be used repeatedly as is frequently the case. One of the features of these frames is that they may be assembled and disassembled with relative ease to facilitate changing of displays. Once the rearward facing surface of the web becomes marred the alignment of the frame sections becomes untrue and the rigidity of the corner joints is impaired. This aggravates the not uncommon condition found in such framing devices in which the forwardly facing surfaces of the beveled ends of the frame sections may not mate properly even when the surfaces of the bracket retaining channel are unmarred.

Described in U.S. Pat. No. 4,122,617 is a corner joining system that obviates the tendency of the screws to mar the channel. That system includes a bearing plate formed from a relatively hard material such as steel and having no holes receptive to the set screws. The bearing plate is interposed in the channel interiorly of the screw bearing bracket. When the set screws are tightened, they bear directly against the plate and not against the softer aluminum frame section. The relatively localized force applied by the set screws to the bearing bracket are distributed evenly across the area of the bearing bracket to the regions of the frame section which are engaged by the bearing bracket. This provides a more effective grip on the framing members over a considerably greater area than had been previously achieved merely by the set screws alone. The relatively hard nature of the bearing bracket virtually eliminates the difficulties heretofore presented by applying the force of the set screws directly against the relatively soft aluminum. The frame may be assembled and disassembled any number of times without deterioration of the alignment or effective locking features of the frame.

Although eliminating the marred channel problem, the system disclosed in U.S. Pat. No. 4,122,617 does exhibit certain disadvantages. For example, the use of a bearing plate adds the cost of additional components and entails additional assembly steps. Another deficiency of prior corner joining systems is that excessive penetration of a corner bracket by a set screw will prevent entry of the bracket into a frame section channel during assembly. In that event, the set screw must be backed off before assembly can be completed.

The object of this invention, therefore is to provide an improved corner joining system for picture frames.

SUMMARY OF THE INVENTION

The present invention is a frame formed by frame sections joined end to end; each frame section having an elongated channel with a rear wall, spaced apart lips opposite the rear wall and defining a longitudinally directed slot and a side wall joining inner edges of each of the lips to a different edge of the rear wall. Securing adjacent pairs of the sections is a bracket having a pair of legs disposed at an angle substantially identical to the angle made by the frame sections, the legs fitting within the channels of said frame sections at their corner junction, and having a width greater than the width of the slots so as to retain the bracket within the channels. A screw with an externally threaded shank is received by a threaded hole in each bracket leg. Each has an outer end adapted to accommodate a tool for producing axial rotation of the screw so as to force outer surface portions of the legs into engagement with inner surface portions of the lips and an inner end defining a contact surface engaging the rear wall of the channel and having an area substantially larger than the cross-sectional area of the shank. The provision of a set screw with an enlarged inner end contact area for engaging the rear wall of the channels eliminates the requirement for a bearing plate.

According to certain features of the invention, each of the screws comprises a head portion projecting radially from one end of the shank and defining the contact surface and adapted to accommodate a tool for producing axial rotation of the shank. These features simplify the operation required to insert the screws into the threaded holes in the bracket legs.

According to another feature of the invention, the combined widths of the head portion and the bracket leg is substantially less than the spacing between the lips and the rear wall. This feature facilitates the attainment of an initial set screw depth that will permit entry of the bracket legs into the frame section channels.

Additionally encompassed by the present invention is a frame formed by frame sections joined end to end; each of the frame sections having an elongated channel with a rear wall, spaced apart lips opposite said rear wall and defining a longitudinally directed slot and a side wall joining inner edges of each of the lips to a different edge of the rear wall. Securing each adjacent pair of the sections is a bracket having a pair of legs disposed at an angle substantially identical to the angle made by the frame sections, the legs fitting within the channels of frame sections at the corner junction and having a width greater than the width of the slots so as to retain the bracket within the channels. Defined by each of the legs is a threaded hole and a planar surface interrupted by elevated portions projecting thereabove. Each threaded hole receives a screw with an inner end for exerting a force on the rear wall and an outer end adapted to accommodate a tool for producing axial rotation of the screw so as to force the planar surface of the leg into engagement with inner surface portions of the lips and to cause penetration thereof by the elevated portions. The penetration of the lip surfaces by the elevated portions of the bracket legs creates a physical bond between the legs and the frame sections.

According to one feature of the invention, the bracket is composed of a material substantially harder than the frame sections. This feature facilitates penetration of the inner surface portions of said lips by the elevated portions of the legs.

According to other features of the invention, the planar surface portions comprise transversely spaced apart, longitudinally directed marginal portions of the legs; each of the spaced apart marginal portions engages a different one of the lips; and the elevated portions penetrate each of the different lips. This arrangement enhances the physical bond created between the bracket legs and frame section.

According to still another feature of the invention, the elevated portions are disposed transversely adjacent to each of the threaded holes. This arrangement provides the elevated portions in positions for receiving maximum force.

According to yet other features of the invention, the elevated portions are formed by material in the bracket displaced by grooves incised in the planar surface portions. This feature provides an efficient mechanism for forming the elevated portions on the bracket legs.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
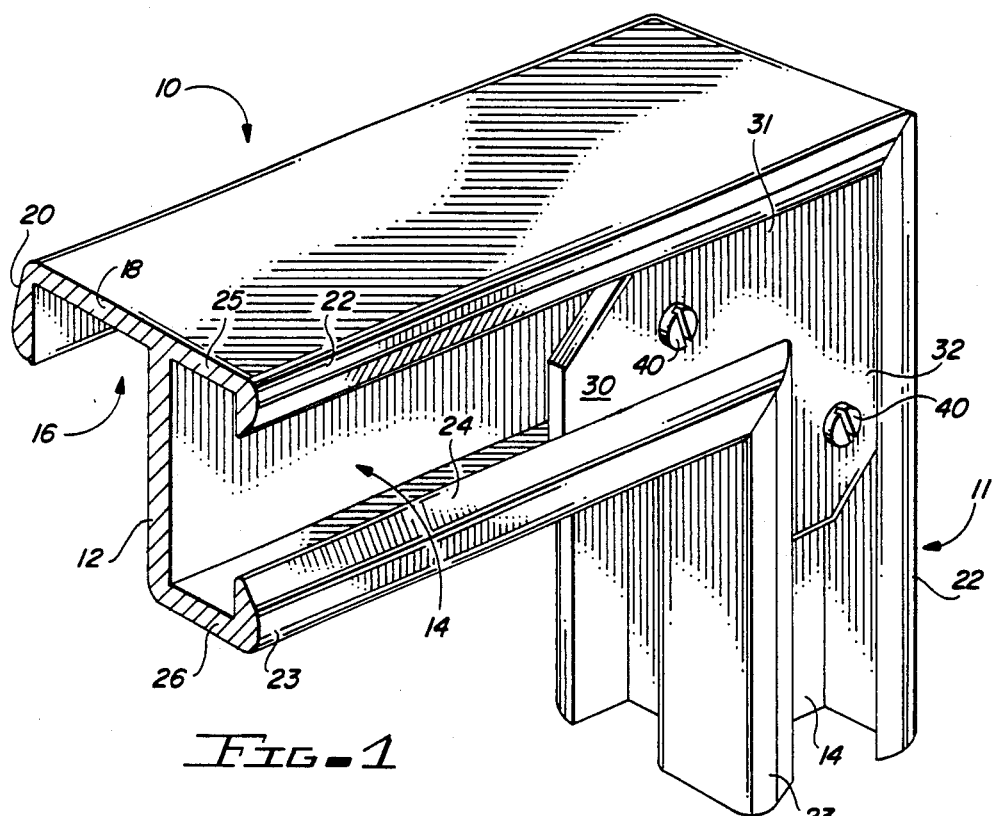
FIG. 1 is a rear perspective view of a frame assembled in accordance with the invention.

FIG. 1 shows a typical corner junction of a frame as viewed from the rear. The frame is constructed from a plurality of frame sections 10, 11 joined at their ends to form a rectangular enclosure. Although only two frame sections 10, 11 are shown in FIG. 1, it will be understood that four frame sections are assembled to form a complete frame. Each of the frame sections 10, 11 is of substantially identical cross-sectional configuration having a central web 12 which is common to a rearwardly opening channel 14 and a picture and glass receiving channel 16 disposed on the forward side of the frame members. The forward picture receiving channel 16 comprises a forward wall portion 18 and a lip 20 which extends inwardly of the completed frame. Defining the rearwardly facing channel 14 are the rear wall web 12, spaced apart lips 22, 23 opposite the rear wall 12 and defining a longitudinally directed slot 24, and side walls 25, 26 joining, respectively, inner edges of the lips 22, 23 and two different edges of the rear wall web 12.

Figure 2:
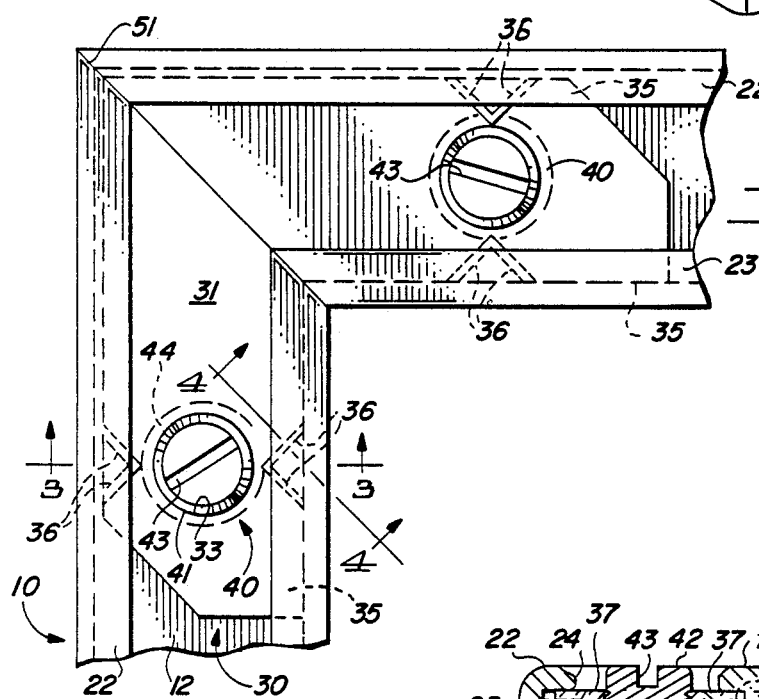
FIG. 2 is a schematic rear view of the frame shown in FIG. 2.
Figure 4:
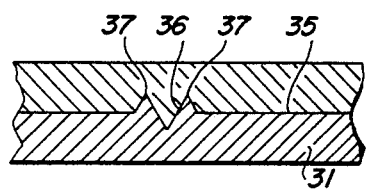
FIG. 4 is a schematic cross-sectional view taken along lines 4—4 of FIG. 2.
Figure 3:
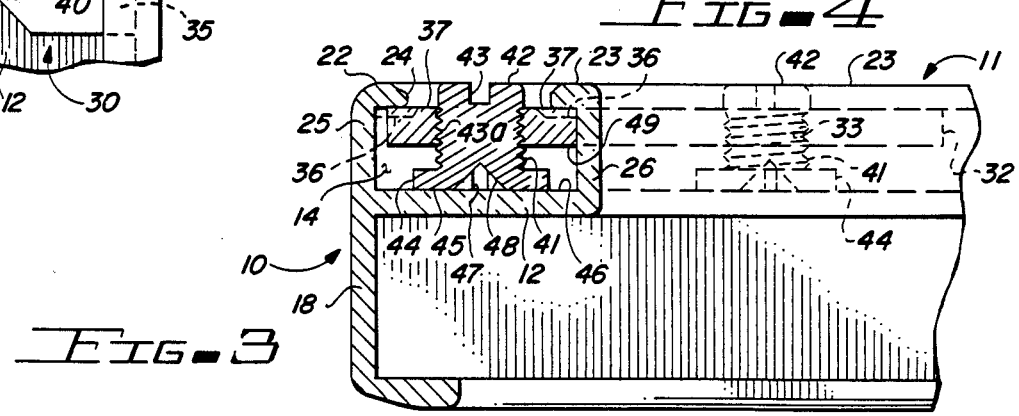
FIG. 3 is a cross-sectional schematic view taken along lines 3—3 of FIG. 2.

A bracket 30 has orthogonally joined legs 31, 32 retained, respectively, by the channels 14 in the joined frame sections 10, 11. As shown in FIGS. 2 and 3, each of the legs 31, 32 has a width greater than the widths of the slots 24 so as to be retained within the channels 14. A threaded hole 33 extends through each of the legs 31, 32. The outer surfaces of the legs 31, 32 include longitudinally extending, transversely spaced apart margins that define planar surface portions 35 facing and aligned with the inner surfaces of the lips 22, 23. Incised in each of the planar surfaces, 22, 23 transversly adjacent to and straddling the threaded hole 33 are a pair of V-shaped grooves 36. Each pair of grooves 36 intersect at a position inwardly of the planar surface portion 35 and have opposite ends that terminate at longitudinally spaced positions on the outer edge thereof. Straddling each of the V-shaped grooves 36 are elevated ridges 37 projecting above the planar surfaces 35. The ridges 37 are formed by bracket material displaced during the formation of the V-shaped grooves 36, as shown in FIG. 4.

Retained by each of the threaded holes 33 is an externally threaded shank 41 of a set screw 40. Formed in an outer end 42 of each screw 40 is a slot 43 for accommodating a conventional screwdriver. An inner end of each screw 40 defines a head portion 44 extending radially outwardly from the shank 41. An outer end of each head portion 44 provides a contact surface 45 engaging an inner surface 46 of the rear wall 12. As clearly shown in FIGS. 2 and 3, the contact surface 45 is substantially larger than the cross-sectional area of the shank 41. Formed in each head portion 44 are intersecting slots 47, 48 for accommodating a Philips type screwdriver.

Prior to assembly of a frame, the shank 41 of a screw 40 is driven into each of the threaded holes 33 until its head portion 44 engages an inner surface 49 of the bracket 30. The legs 31, 32, respectively, are then inserted into the channels 14 of adjoining frame sections 10, 11 which then are drawn together at a mitered corner 51. Clearance for fitting of the assembled bracket 30 and set screw 40 within a frame section channel 14 is insured because the combined width of the bracket 30 and the screw head portion 44 is less than the spacing between the channel rear wall 12 and the lips 22, 23 as shown in FIG. 3. A conventional screwdriver is positioned in the slot 43 in and used to rotate the screw 40 producing separation between the bracket 30 and the head portion 44. This operation is continued until a wedging action produces contact between the contact surface 45 of the head portion 44 and the inner surface 46 of the channel rear wall 12, and the elevated portions 37 on the planar surfaces 35 and the inner surfaces of the lips 22, 23. A slight additional tightening of the screw 40 causes the relatively hard elevated ridges 37 on the planar surfaces 35 to penetrate the relatively soft inner surfaces of the lips 22, 23 producing engagement between the inner surfaces thereof and the planar surfaces 35 of the bracket 30.

Because of the enlarged contact surface 45 provided by the head portion 44 of the screw 40, any tendency of the tightened screw 40 to mar the relatively soft surface of the rear channel wall 12 is substantially reduced. In addition, the increased surface area 45 enhances the frictional holding force generated between the screw 40 and the inner surface 46 of the rear channel wall 12. Thus, a stronger joint is created by the bracket 30 between the frame sections 10, 11. The strength of that joint is further enhanced by the physical bond between the bracket 30 and the frame sections 10, 11 created by penetration of the inner surfaces of the lips 22, 23 by the elevated ridges 37 on the planar surfaces 35.

Obviously, many modifications and variations of the present invention are possible in light of the above teachings. It is to be understood, therefore, that the invention can be practiced otherwise than as specifically described.

What is claimed:

1. In a frame formed by frame sections joined end to end, each of said frame sections having an elongated channel with a rear wall, spaced apart lips opposite said rear wall and defining a longitudinally directed slot and a side wall joining inner edges of each of said lips to a different edge of said rear wall, and improved means for securing an adjacent pair of said sections together at a corner junction and comprising:

a bracket having a pair of legs disposed at an angle substantially identical to the angle made by said frame sections at said corner junction, said legs fitting within said channels of said frame sections at said corner junction, said legs having a width greater than the width of said slots so as to retain said bracket within said channels in said adjacent frame sections, and each of said legs having a threaded hole extending therethrough and defining planar surface portions interrupted by elevated portions projecting thereabove; and a screw with an externally threaded shank for engagement with each of said threaded holes, said screw having an inner end for exerting a force on said rear wall and an outer end adapted to accommodate a tool for producing axial rotation of said screw to force said planar surface portions of said legs into engagement with inner surface portions of said lips and to cause penetration thereof by said elevated portions to thereby create a physical bond between said legs and said frame sections.

2. A frame according to claim 1 wherein said bracket is composed of a material substantially harder than said frame sections so as to facilitate penetration of said inner surface portions of said lips by said elevated portions of said legs.

3. A frame according to claim 2 wherein said planar surface portions comprise transversely spaced apart longitudinally directed marginal portions of said legs; each of said spaced apart marginal portions engaging a different one of said lips; and said elevated portions penetrate each of said different lips.

4. A frame according to claim 2 wherein said elevated portions are disposed transversely adjacent to each of said threaded holes.

5. A frame according to claim 2 wherein said elevated portions are formed by material in said bracket displaced by grooves incised in said planar surface portions.

6. In a frame formed by frame sections joined end to end, each of said frame sections having an elongated channel with a rear wall, spaced apart lips opposite said rear wall and defining a longitudinally directed slot and a side wall joining inner edges of each of said lips to a different edge of said rear wall, an improved means for securing an adjacent pair of said sections together at a corner junction and comprising:

a bracket having a pair of legs disposed at an angle substantially identical to the angle made by said frame sections at said corner junction, said legs fitting within said channels of said frame sections at said corner junction, said legs having a width greater than the width of said slots so as to retain said bracket within said channels in said adjacent frame sections, and each of said legs having a threaded hole extending therethrough and defining planar surface portions including transversely spaced apart longitudinally directed marginal portions of said legs, each of said marginal portions engaging a different lip of said slot, and each marginal portion interrupted by elevated portions projecting thereabove, said bracket made of a material substantially harder than that of said frame section; and a screw with an externally threaded shank for engagement with each of said threaded holes, said screw having an inner end for exerting a force on said rear wall and an outer end adapted to accommodate a tool for producing axial rotation of said screw to force said marginal portions of said legs into engagement with inner surface portions of said lips and to cause penetration of said lips by said elevated portions, thereby creating a physical bond between said legs and said frame sections.

7. A frame according to claim 6 wherein said elevated portions are disposed transversely adjacent to each of said threaded holes.

8. A frame according to claim 7 wherein said elevated portions are formed by material in said bracket disposed by grooves incised in said planar surface portions.

9. In a frame formed by frame sections joined end to end, each of said frame sections having an elongated channel with a rear wall, spaced apart lips opposite said rear wall and defining a longitudinally directed slot and a side wall joining inner edges of each of said lips to a different edge of said rear wall, an improved means for securing an adjacent pair of said sections together at a corner junction and comprising:

a bracket having a pair of legs disposed at an angle substantially identical to the angle made by said frame sections at said corner junction, said legs fitting within said channels of said frame sections at said corner junction, said legs having a width greater than the width of said slots so as to retain said bracket within said channels in said adjacent frame sections, and each of said legs having a threaded hole extending therethrough and defining planar surface portions interrupted by elevated portions projecting thereabove, said elevated portions disposed transversely adjacent to each of said threaded holes, said bracket made of a material substantially harder than that of said frame section; and a screw with an externally threaded shank for engagement with each of said threaded holes, said screw having an inner end for exerting a force on said rear wall and an outer end adapted to accommodate a tool for producing axial rotation of said screw to force said marginal portions of said legs into engagement with inner surface portions of said lips and to cause penetration of said lips by said elevated portions, thereby creating a physical bond between said legs and said frame sections.

10. In a frame formed by frame sections joined end to end, each of said frame sections having an elongated channel with a rear wall, spaced apart lips opposite said rear wall and defining a longitudinally directed slot and a side wall joining inner edges of each of said lips to a different edge of said rear wall, an improved means for securing an adjacent pair of said sections together at a corner junction and comprising:

a bracket having a pair of legs disposed at an angle substantially identical to the angle made by said frame sections at said corner junction, said legs fitting within said channels of said frame sections at said corner junction, said legs having a width greater than the width of said slots so as to retain said bracket within said channels in said adjacent frame sections, and each of said legs having a threaded hole extending therethrough and defining planar surface portions interrupted by elevated portions projecting thereabove, said elevated portions formed by material in said bracket displaced by grooves incised in said planar surface portions, said bracket made of a material substantially harder than that of said frame section; and a screw with an externally threaded shank for engagement with each of said threaded holes, said screw having an inner end for exerting a force on said rear wall and an outer end adapted to accommodate a tool for producing axial rotation of said screw to force said marginal portions of said legs into engagement with inner surface portions of said lips and to cause penetration of said lips by said elevated portions, thereby creating a physical bond between said legs and said frame sections.

11. A frame according to claim 10 wherein said elevated portions are disposed transversely adjacent to each of said threaded holes.

12. A frame assembly comprising:

a plurality of frame sections, each section including a C-shaped elongated channel having a rear wall and spaced apart lips adjoining a slot opposite the rear wall;

a bracket for joining a pair of said frame sections, said bracket including a pair of legs, each leg fitting within said C-shaped channel of said frame section, each leg including a threaded hole extending therethrough, and defining a planar surface interrupted by elevated portions projecting above said planar surface, said elevated portions disposed transversely adjacent to each of said threaded holes, said bracket made of a material substantially harder than that of said frame section; and a screw having an threaded shank for engagement with said threaded hole of said leg of said bracket, said screw having an inner end for engaging said rear wall, said inner end defining a contact area larger than the cross-sectional area of said shank, and an outer end adapted for receiving an axial rotation causing tool, whereby threading said screw into said hole causes said inner end of said screw to engage said rear wall and causes penetration of said lips by said elevated portions of said legs.

* * * * *